(12) United States Patent
Chen

(10) Patent No.: US 9,568,116 B2
(45) Date of Patent: Feb. 14, 2017

(54) ELECTRIC VALVE ACTUATOR

(71) Applicant: Shui-Ching Chen, Taichung (TW)

(72) Inventor: Shui-Ching Chen, Taichung (TW)

(73) Assignee: Sun Yeh Electrical Ind. Co., Ltd., Taichung (TW)

( * ) Notice: Subject to any disclaimer, the term of this patent is extended or adjusted under 35 U.S.C. 154(b) by 18 days.

(21) Appl. No.: 14/821,695

(22) Filed: Aug. 8, 2015

(65) Prior Publication Data

US 2016/0053913 A1    Feb. 25, 2016

(30) Foreign Application Priority Data

Aug. 20, 2014 (TW) .............................. 103214885 U

(51) Int. Cl.
*F16K 31/04* (2006.01)
*F16K 31/53* (2006.01)
*F16H 1/20* (2006.01)

(52) U.S. Cl.
CPC ............. *F16K 31/047* (2013.01); *F16H 1/203* (2013.01); *F16K 31/53* (2013.01)

(58) Field of Classification Search
CPC ...... F16K 31/047; F16K 31/53; F16K 31/535; F16K 31/046; F16H 1/203
USPC ... 251/129.11–129.13, 248, 249.5; 74/89.16, 425
See application file for complete search history.

(56) References Cited

U.S. PATENT DOCUMENTS

| 1,898,242 | A | * | 2/1933 | Chandler | .................. | H02P 3/12 |
| | | | | | | 251/249.5 |
| 3,216,278 | A | * | 11/1965 | Plume | ..................... | F16K 31/05 |
| | | | | | | 74/625 |
| 3,552,225 | A | * | 1/1971 | Voorhis | ..................... | F16H 1/16 |
| | | | | | | 74/413 |

(Continued)

FOREIGN PATENT DOCUMENTS

| CN | 103511717 A | 1/2014 |
| CN | 203516912 U | 4/2014 |
| GB | 2216980 A | 10/1989 |

OTHER PUBLICATIONS

Intact United Kingdom Intellectual Property Office(UKIPO) Search Report dated Apr. 21, 2015 for corresponding UK Patent Application No. GB1419573.9 , 4 pages.

*Primary Examiner* — John Bastianelli
(74) *Attorney, Agent, or Firm* — Minder Law Group; Willy H. Wong

(57) ABSTRACT

An electric valve actuator, including a power output member having a first engagement section; a rod member fixedly disposed on the power output member; a first transmission member pivotally disposed on the power output member and having a second engagement section and a first worm gear section; a second transmission member pivotally disposed on the rod member and having a shaft body section and an eccentric shaft section; a third transmission member pivotally disposed on the eccentric shaft section and having a third engagement section, a lower section of the third engagement section being engaged with the first engagement section, an upper section being engaged with the second engagement section; a fourth transmission member fixedly disposed on the shaft body section and having a second worm gear section; a first worm engaged with the first worm (Continued)

gear section; and a second worm engaged with the second worm gear section.

19 Claims, 13 Drawing Sheets

(56) References Cited

U.S. PATENT DOCUMENTS

| | | | | |
|---|---|---|---|---|
| 3,949,626 | A * | 4/1976 | Berlinger, Jr. | F16H 37/00 475/3 |
| 6,003,837 | A * | 12/1999 | Raymond, Jr. | F16K 31/055 251/129.12 |
| 6,129,337 | A | 10/2000 | Wu | |
| 6,186,471 | B1 * | 2/2001 | Genga | F16K 31/046 251/129.12 |
| 6,712,727 | B2 * | 3/2004 | Kujira | F16H 37/041 74/425 |
| 7,192,004 | B2 | 3/2007 | Chen | |
| 8,342,478 | B1 * | 1/2013 | Cordray | F16K 37/0075 251/129.04 |

* cited by examiner

ELECTRIC VALVE ACTUATOR

CROSS-REFERENCE TO RELATED APPLICATIONS

This application claims benefit of Taiwanese Patent Application No. 103214885, filed Aug. 20, 2014, the entire contents of which are hereby incorporated by reference.

The above application and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

BACKGROUND OF THE INVENTION

Field of Invention

The present invention relates generally to valves, and more particularly to electric valve actuators or an electrical control device for valves.

Related Art

Various electrical control devices for quickly and conveniently controlling and opening/closing valves have been developed. The electrical control device is used to control ball valves, butterfly valves or the like valves instead of the conventional manually operated means.

In one prior art anti-explosion valve drive device, a drive motor is used to directly drive a spur gear set to sequentially drive an eccentric shaft and an output shaft so as to drive and open/close the valve. When the output shaft drives the valve to reach the closed position (0-degree opening position), the drive motor is powered off to stop operating. However, in practice, at this time, the valve will apply a pushback force due to the impact of the material transferred through the pipeline. In this case, the entire drive gear set will be slightly backward rotated. As a result, the valve is not truly fully closed and the opening of the valve is larger than 0 degree. Therefore, some of the material transferred through the pipeline will still pass through the valve. This will bother the user or even cause a fire or explosion.

In order to solve the above problem, some manufacturers additionally provide a brake device for the drive motor. Accordingly, when the output shaft drives the valve to reach the closed position, not only the motor is powered off to stop operating, but also the brake device is activated to lock the entire drive gear set and prevent the entire gear set from rotating. In this case, the entire drive gear set is prevented from being pushed back so that the valve can be truly fully closed.

However, the additional brake device of the drive motor leads to great increase of failure ratio of the drive motor and reduction of operation reliability of the drive motor.

SUMMARY OF THE INVENTION

It is therefore an object of the present invention to avoid the issues of the prior art stated above.

It is further object of the invention to provide an electric valve actuator that can truly control the valve and fully close the valve to a 0-degree opening position.

It is further object of the invention to provide an electrical control device that obviates the need for a brake device for the drive motor.

It is further object of the invention to provide an electrical control device that reduces the failure ratio of the motor.

It is further object of the invention to provide an electrical control device that lowers the service cost of the motor.

It is further object of the invention to provide a simple, efficient, durable, and cost effective electric valve actuator.

DETAILED DESCRIPTION OF THE INVENTION

Figure 1:
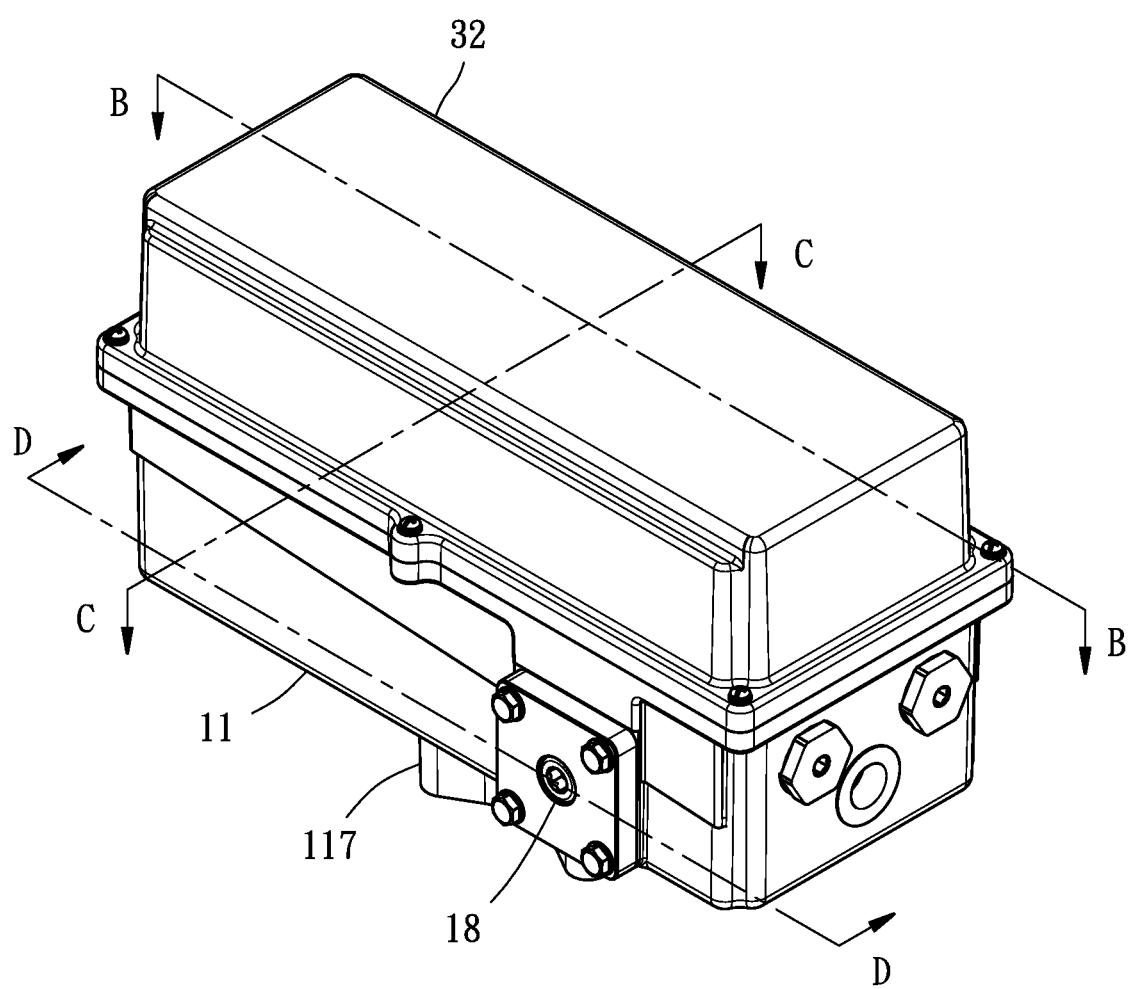
FIG. 1 is a perspective view of one preferred embodiment of the present invention in an assembled state.
Figure 2:
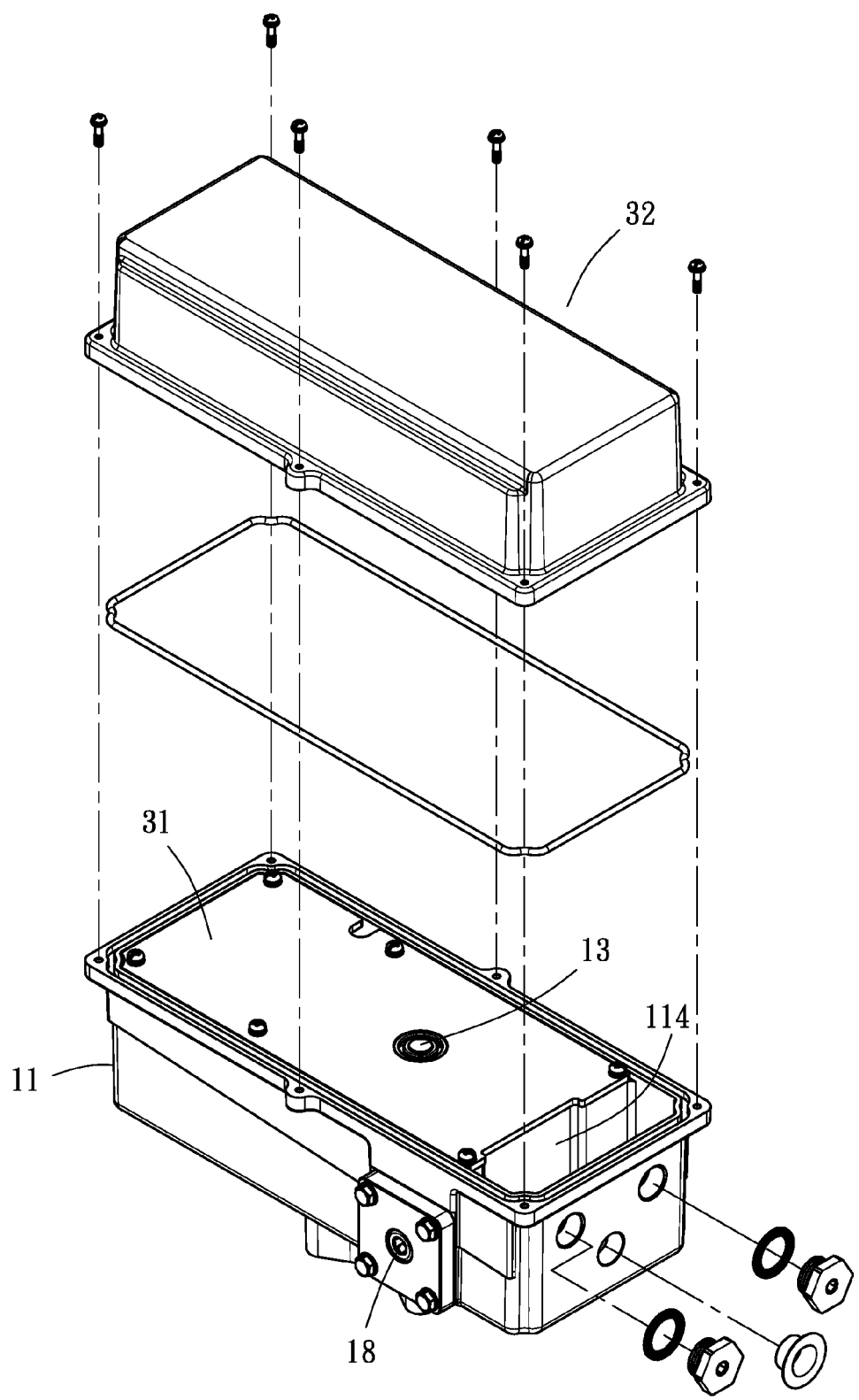
FIG. 2 is a perspective view of the present invention in a first partially exploded state.
Figure 3:
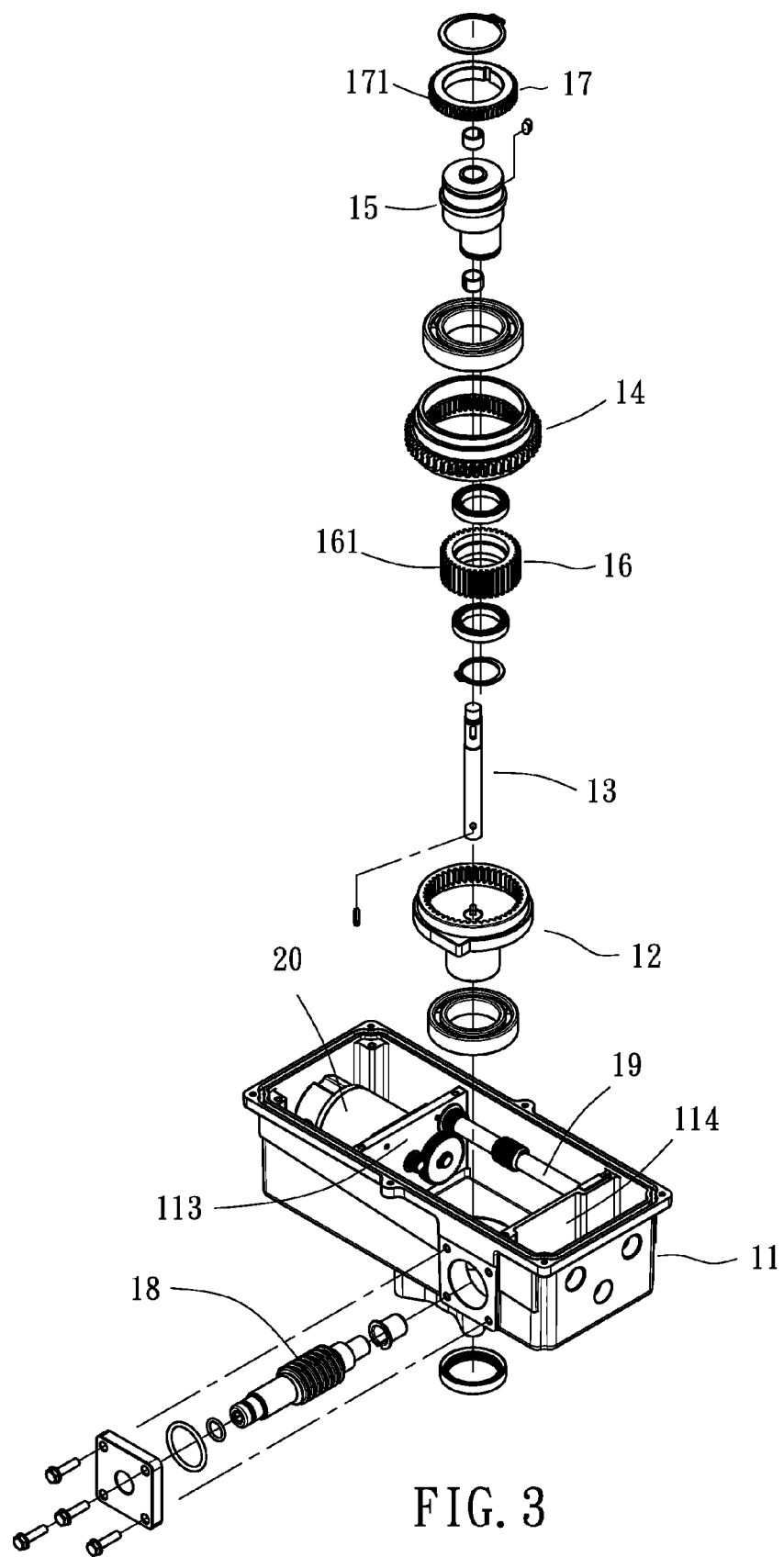
FIG. 3 is a perspective view of the present invention in a second partially exploded state.
Figure 4:
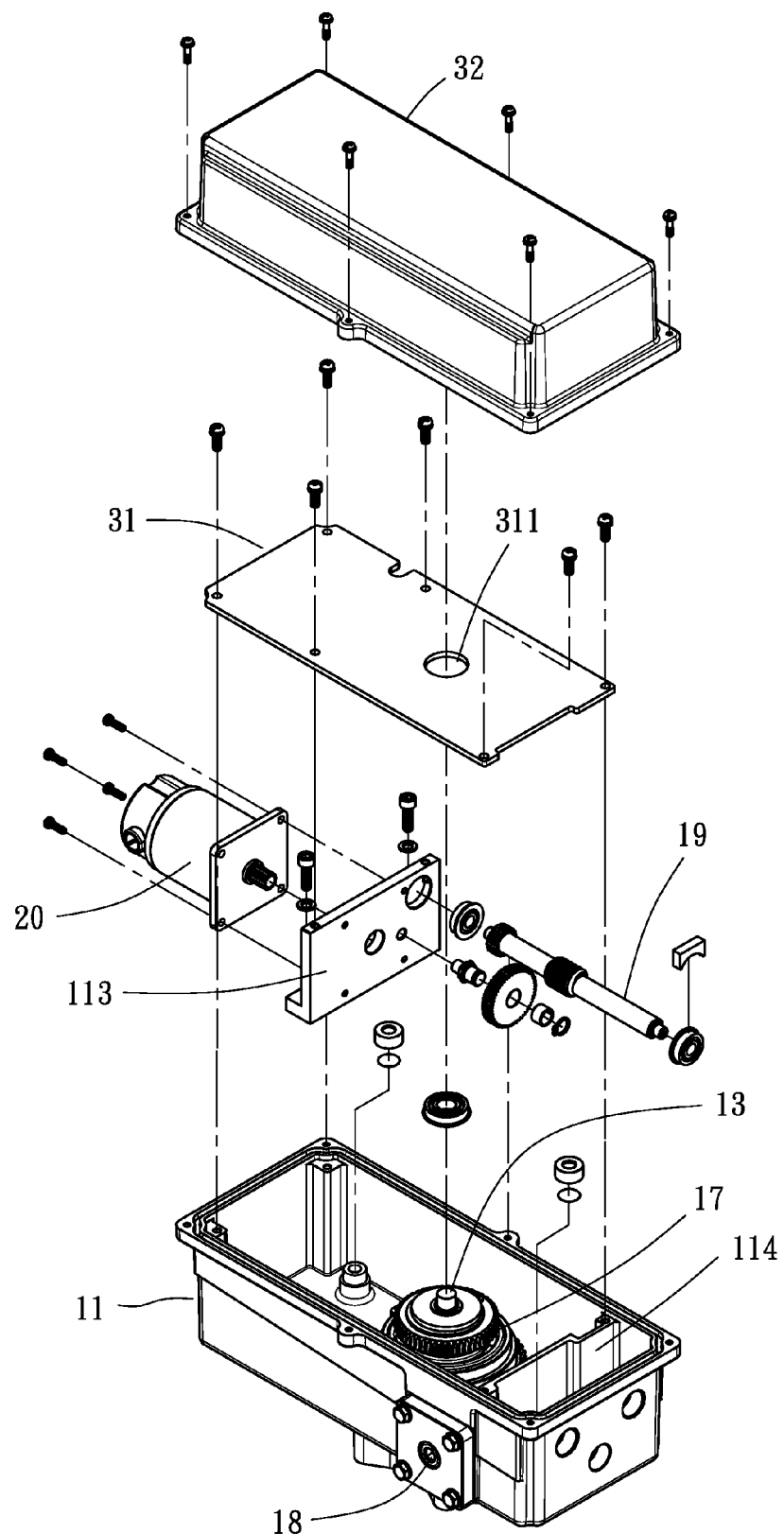
FIG. 4 is a perspective view of the present invention in a third partially exploded state.
Figure 5:
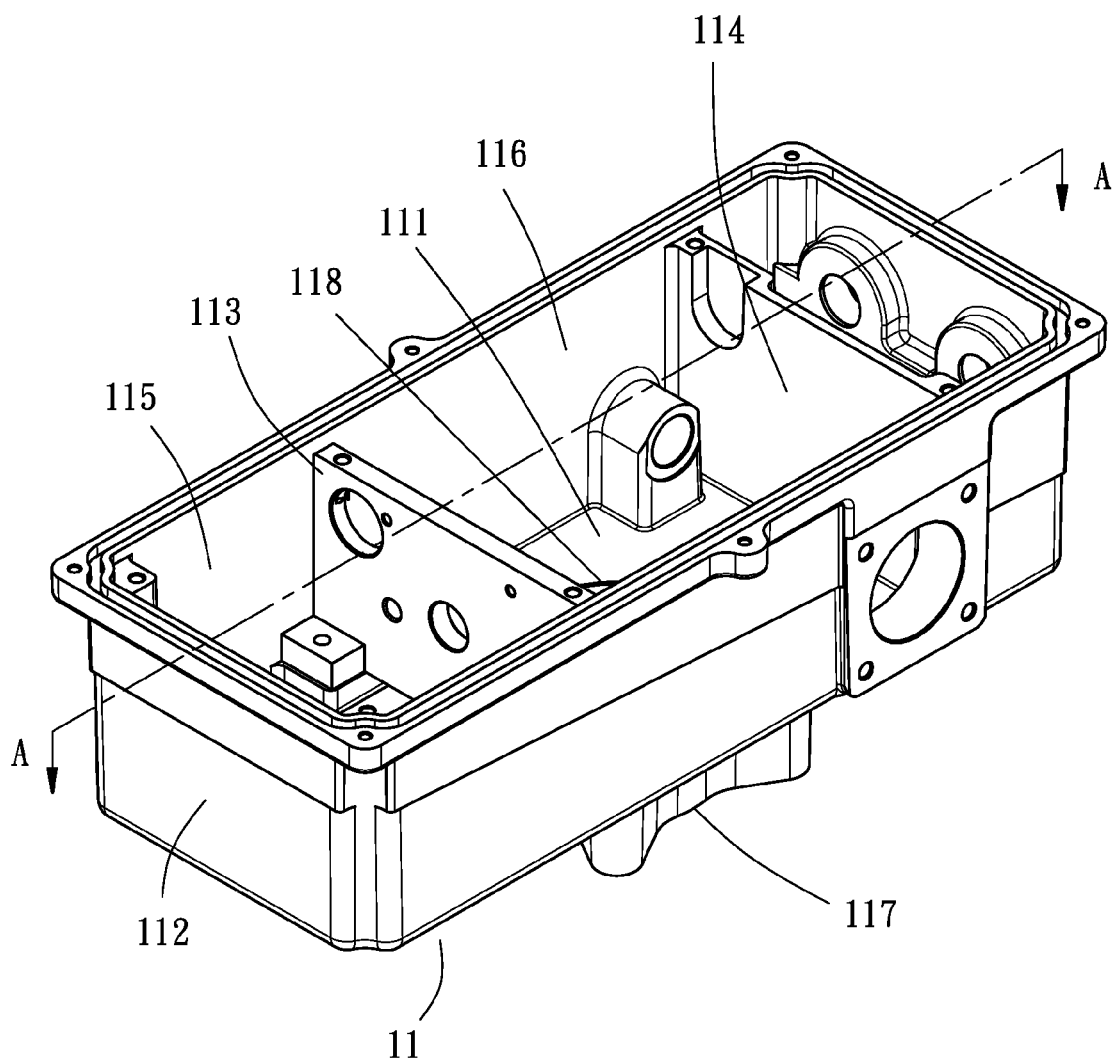
FIG. 5 is a perspective view of the lower casing 11 of FIG. 4.
Figure 6:
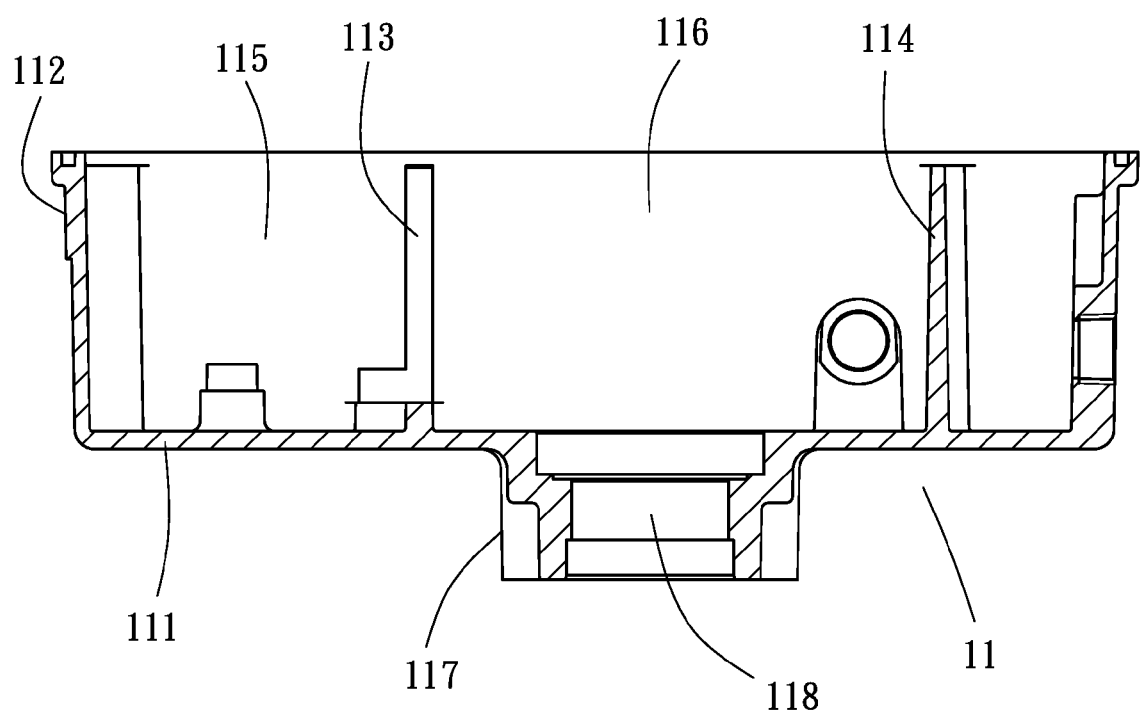
FIG. 6 is a sectional view taken along line A-A of FIG. 5.
Figure 7:
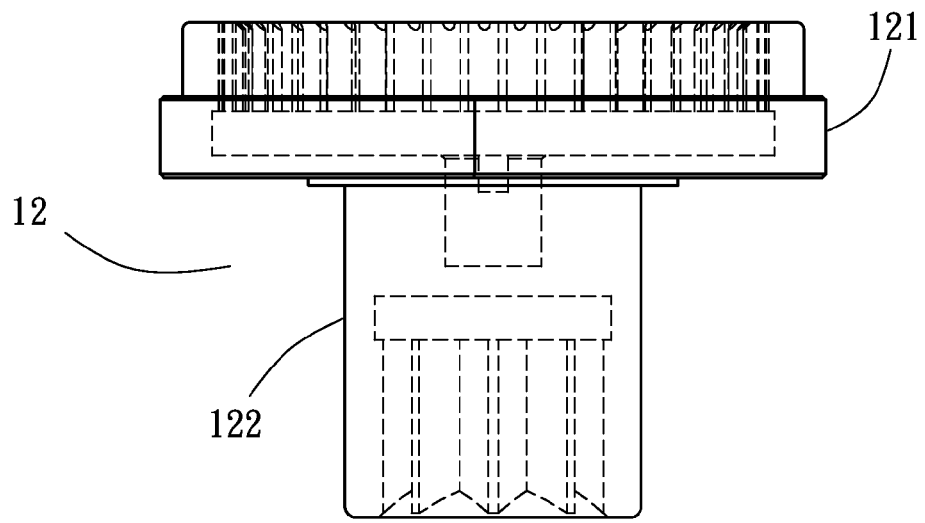
FIG. 7 is a view showing the structural characteristics of the power output member 12 of FIG. 3.
Figure 8:
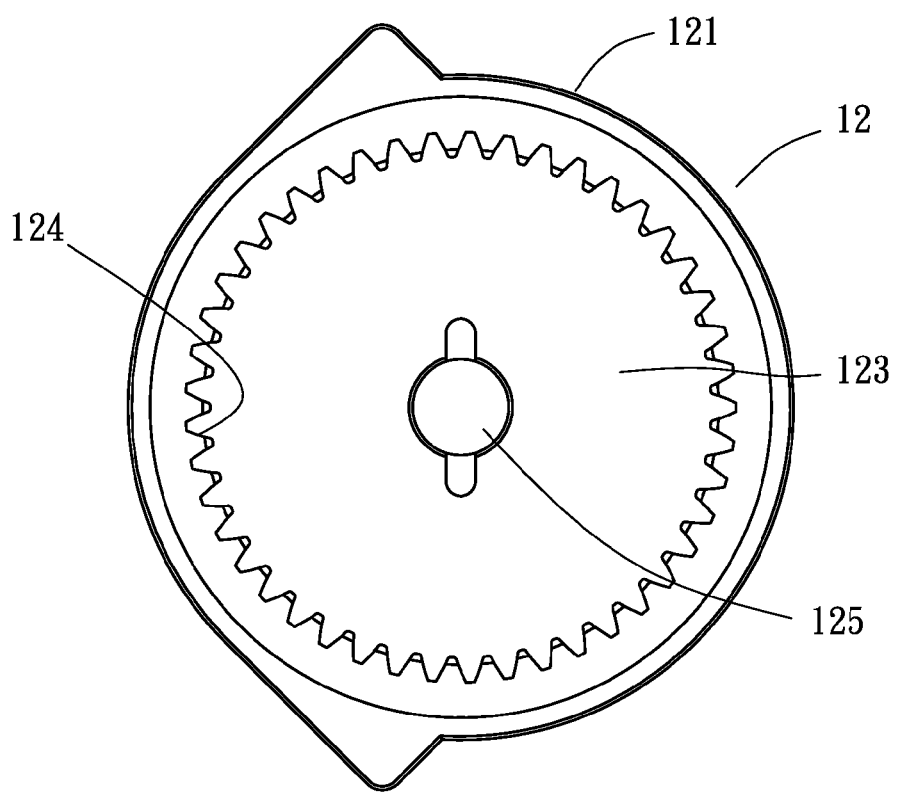
FIG. 8 is a top view of the power output member 12 of FIG. 3.
Figure 9:
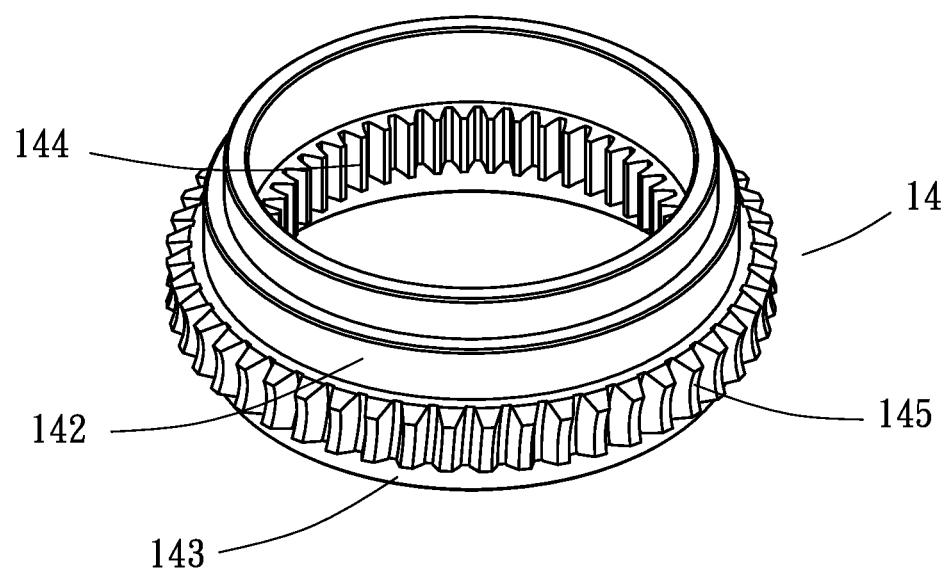
FIG. 9 is a perspective view of the first transmission member 14 of FIG. 3.
Figure 10:
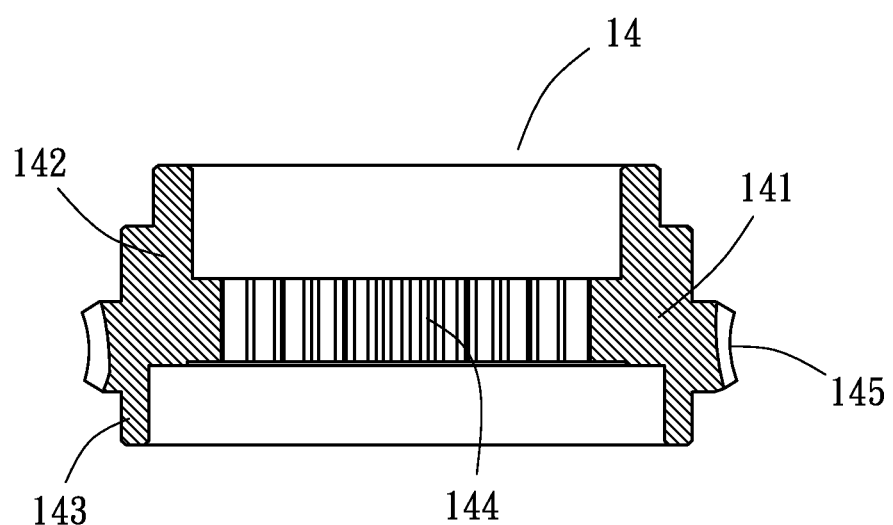
FIG. 10 is a sectional view of the first transmission member 14 of FIG. 3.
Figure 11:
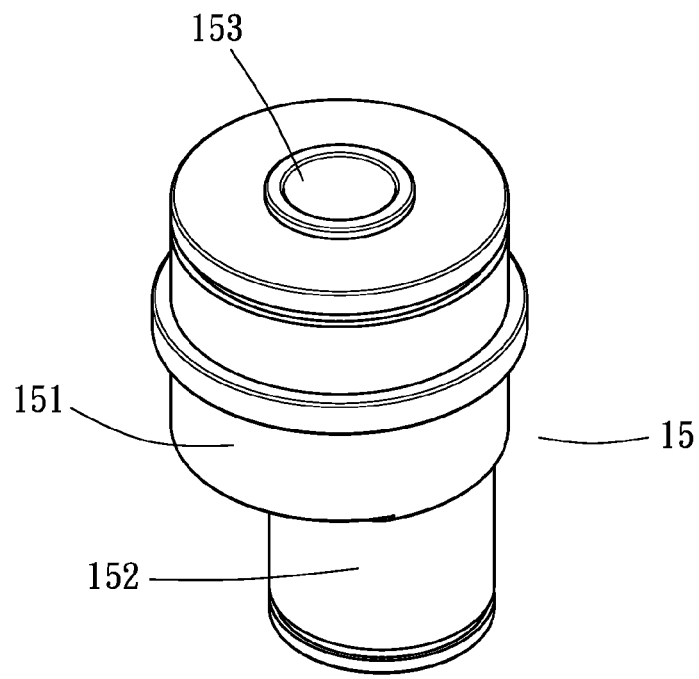
FIG. 11 is a perspective view of the second transmission member 15 of FIG. 3.
Figure 12:
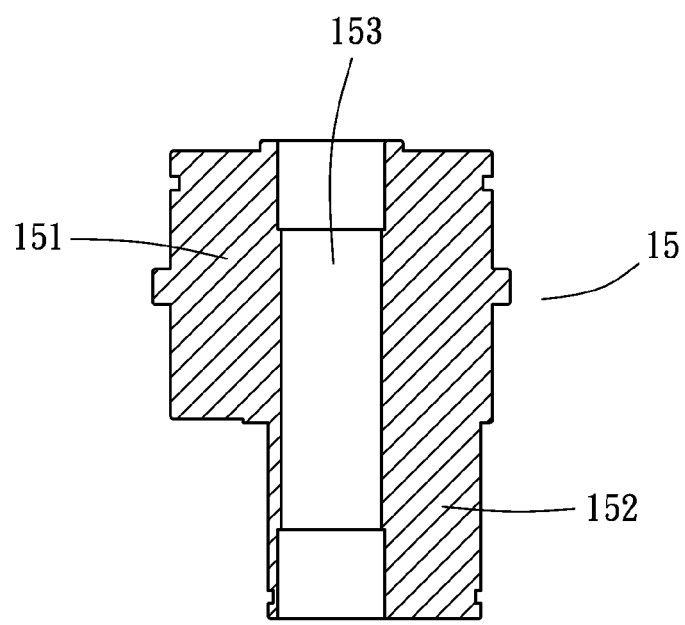
FIG. 12 is a sectional view of the second transmission member 15 of FIG. 3.
Figure 13:
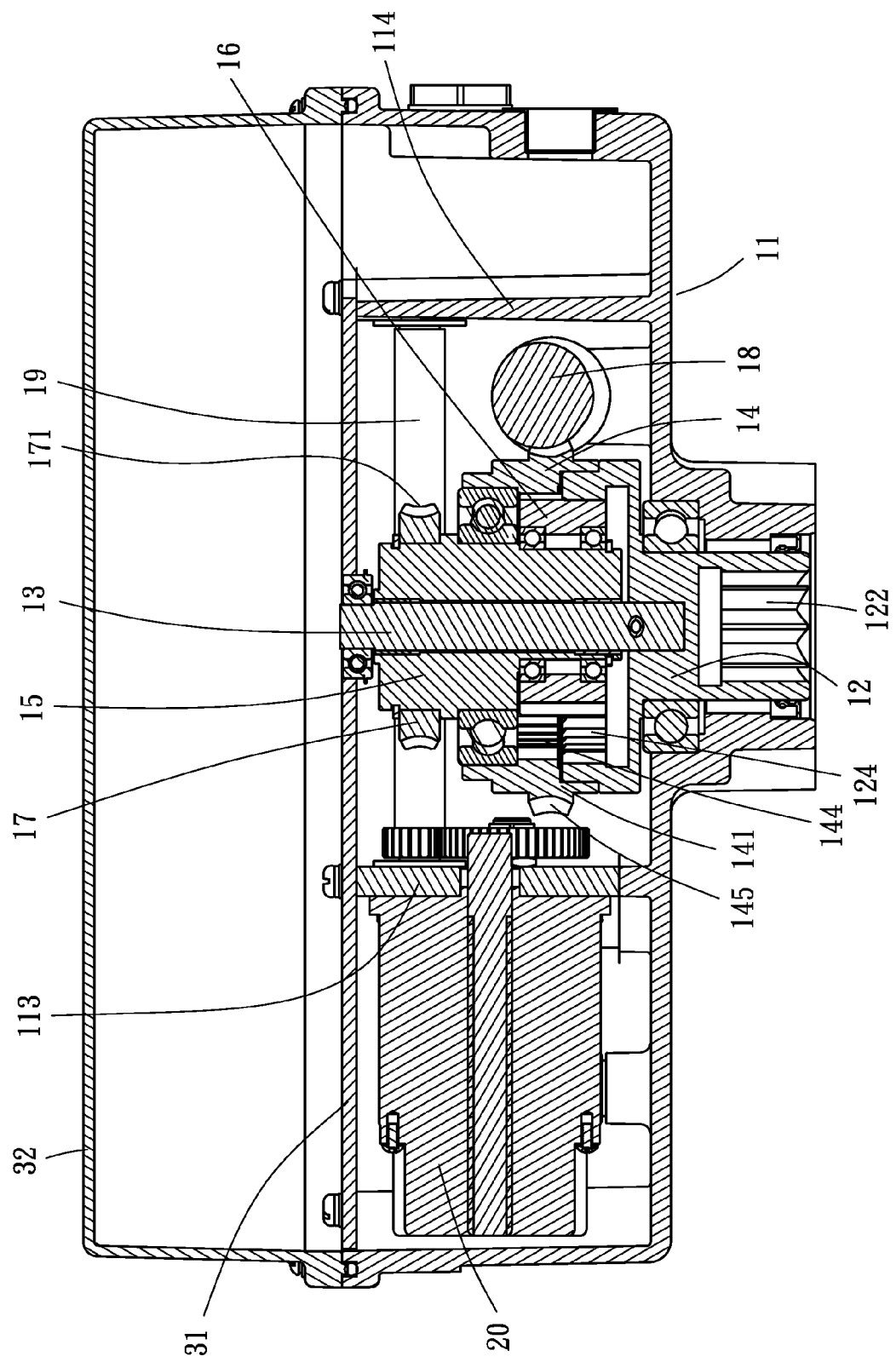
FIG. 13 is a sectional view taken along line B-B of FIG. 1.
Figure 14:
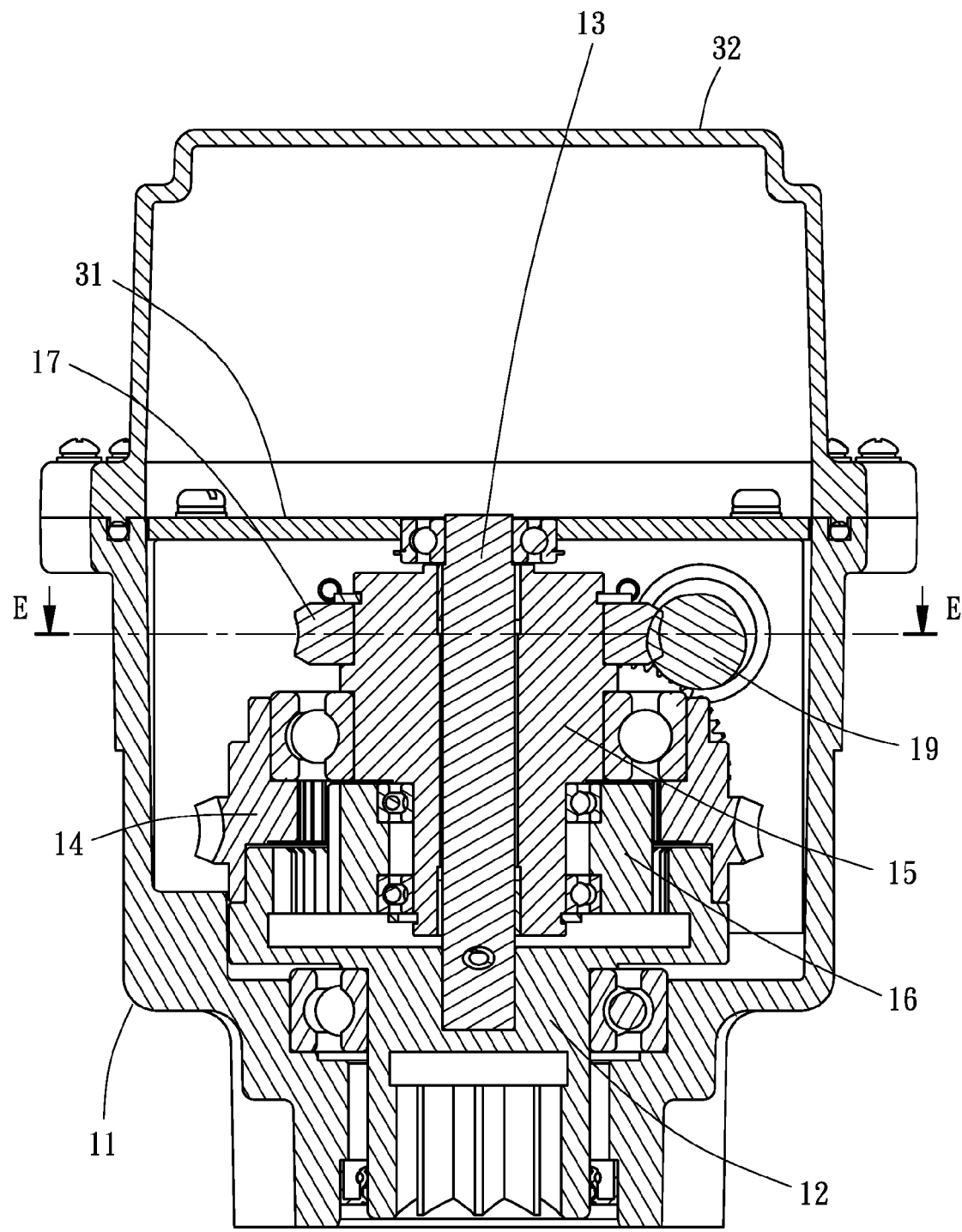
FIG. 14 is a sectional view taken along line C-C of FIG. 1.
Figure 15:
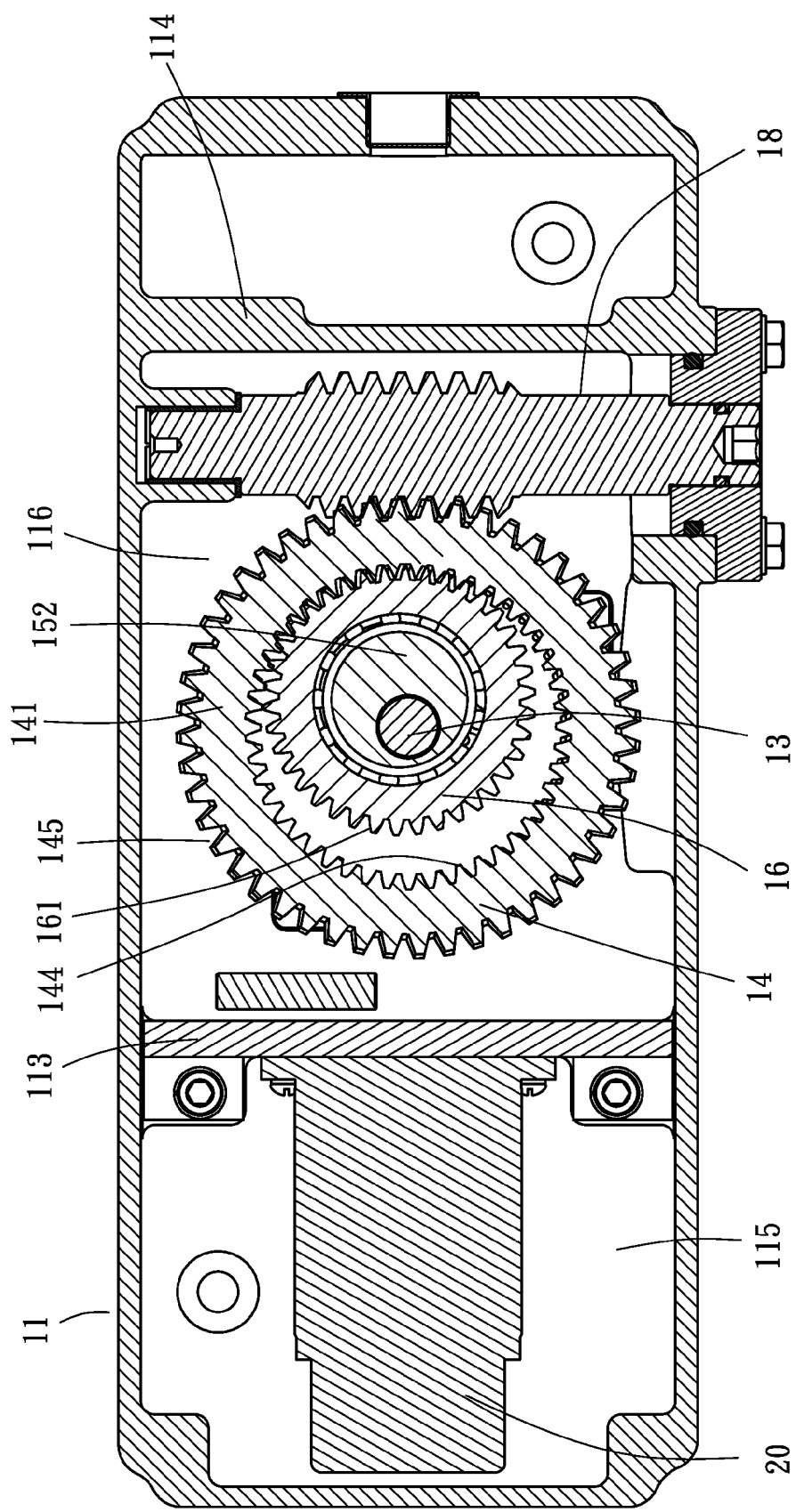
FIG. 15 is a sectional view taken along line D-D of FIG. 1.
Figure 16:
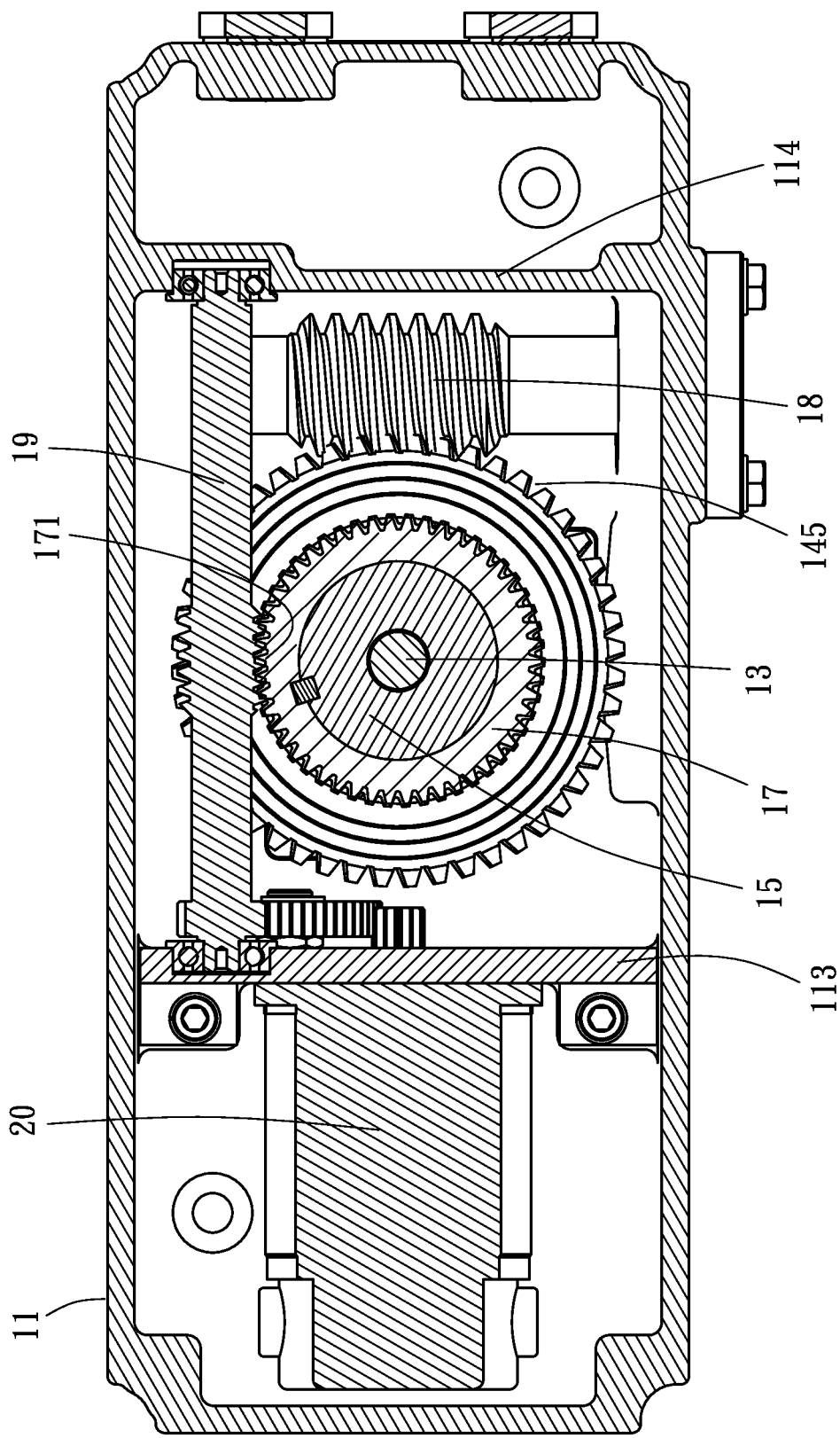
FIG. 16 is a sectional view taken along line E-E of FIG. 14.

Referring to FIGS. 1 to 16, an electric valve actuator of the present invention comprises a lower casing 11, a power output member 12, a rod member 13, a first transmission member 14, a second transmission member 15, a third transmission member 16, a fourth transmission member 17, a first worm 18, a second worm 19, a drive motor 20, a cover board 31, and an upper casing 32.

The lower casing 11 substantially in the form of a cuboidal body. The lower casing 11 has a bottom board section 111 and a frame section 112 upward extending from a periphery of the bottom board section 111 to define a receiving space open to upper side. A first partitioning board 113 and a second partitioning board 114 are disposed in the receiving space to form a first chamber 115 and a second chamber 116. In addition, a hub section 117 downward extends from bottom face of the bottom board section 111. The hub section 117 is formed with a first perforation 118 axially upward extending from bottom face of the hub section 117 to top face of the bottom board section 111.

The power output member 12 has a disc block section 121 and a fitting section 122 downward extending from bottom face of the disc block section 121. A downward extending circular hole section 123 is formed on top face of the disc block section 121. A first engagement section 124 is formed on a circumferential wall of the circular hole section 123. The first engagement section 124 can be a spur gear. An axially downward extending locating hole 125 is formed at a center of top face of the circular hole section 123. The fitting section 122 of the power output member 12 is downward pivotally located in the first perforation 118 of the lower casing 11 with the disc block section 121 positioned in the second chamber 116.

A bottom end of the rod member 13 is fixedly disposed in the locating hole 125 of the power output member 12.

The first transmission member 14 has a middle ring section 141, an upper ring section 142 extending from upper side of the middle ring section 141 and a lower ring section 143 extending from lower side of the middle ring section 141. The lower ring section 143 is pivotally disposed around an upper section of the disc block section 121 of the power output member 12. A second engagement section 144 is disposed on inner circumference of the middle ring section 141. The second engagement section 144 can be a spur gear. The number of the teeth of the second engagement section 144 is different from the number of the teeth of the first engagement section 124 by one or two. In addition, a first worm gear section 145 is disposed on outer circumference of the middle ring section 141.

The second transmission member 15 has a shaft body section 151. An eccentric shaft section 152 axially downward extends from bottom section of the shaft body section 151. An axially downward extending second perforation 153 is formed on top section of the shaft body section 151. The second transmission member 15 is pivotally disposed on the rod member 13 via the second perforation 153.

The third transmission member 16 is pivotally disposed on the eccentric shaft section 152 of the second transmission member 15. A third engagement section 161 is disposed on outer circumference of the third transmission member 16. The third engagement section 161 can be a spur gear. A lower section of the third engagement section 161 is engaged with the first engagement section 124 of the power output section 12. An upper section of the third engagement section 161 is engaged with the second engagement section 144 of the first transmission member 14.

The fourth transmission member 17 is fixedly disposed on the shaft body section 151 of the second transmission member 15. A second worm gear section 171 is disposed on outer circumference of the fourth transmission member 17.

The first worm 18 is pivotally located in the second chamber 116 of the lower casing 11 and engaged with the first worm gear section 145 of the first transmission member 14. A hand wheel (not shown) can be mounted at one end of the first worm 18.

Two ends of the second worm 19 are respectively pivotally located on the first and second partitioning boards 113, 114 of the lower casing 11. The second worm 19 is engaged with the second worm gear section 171 of the fourth transmission member 17.

The drive motor 20 is disposed in the first chamber 115 of the lower casing 11 for driving the second worm 19 to rotate.

The cover board 31 is mounted on upper side of the first and second chambers 115, 116 of the lower casing 11 for blocking the first and second chambers 115, 116. The cover board 31 is formed with a pivot hole 311 in a predetermined position. A top section of the rod member 13 is pivotally disposed in the pivot hole 311.

The upper casing 32 is mounted on upper side of the lower casing 11.

In operation, the drive motor 20 first drives the second worm 19 to rotate. The second worm 19 drives the fourth transmission member 17 to rotate around the rod member 13. The eccentric shaft section 152 will urge the third transmission member 16 to revolve around the rod member 13 as a planet. At this time, the power output member 12 is restricted by the first worm 18 from rotating. After the third transmission member 16 orbits the second engagement section 144 by one circle, the first engagement section 124 is only very slightly rotated to achieve a very large reduction ratio so as to produce very great output torque for the fitting section 122 of the power output member 12 to open/close the valve.

In the case that the drive motor 20 is powered off due to blackout or power failure, the power output member 12 can be alternatively manually rotated. An operator can drive the first worm 18 via the hand wheel, whereby the first transmission member 14 can drive the third transmission member 16 to rotate the power output member 12 for opening/closing the valve.

In the present invention, the drive motor 20 first drives the second worm 19 and the second worm gear section 171 of the fourth transmission member 17 to further drive other transmission members to rotate. When the power output member 12 drives the valve to a closed position (0-degree opening position), the drive motor 20 is powered off to stop operating. Even if the valve applies a pushback force, the second worm 19 and the second worm gear section 171 have automatic locking ability so that all the transmission members will not rotate backward. This ensures that all the valves can be controlled and operated to reach a fully closed position. Moreover, in the present invention, it is unnecessary to additionally provide a brake device to brake the drive motor 20. Therefore, the failure ratio of the motor is reduced and the service cost of the motor is lowered. In addition, the operation reliability of the motor is enhanced.

The above embodiment is only used to illustrate the present invention, not intended to limit the scope thereof. Many modifications of the above embodiments can be made without departing from the spirit of the present invention.

LIST OF REFERENCE NUMERALS 11 lower casing
12 power output member
13 rod member
14 first transmission member
15 second transmission member
16 third transmission member
17 fourth transmission member
18 first worm
19 second worm
20 drive motor
31 cover board
32 upper casing
111 bottom board section
112 frame section
113 first partitioning board
114 second partitioning
115 first chamber
116 second chamber
117 hub section
118 first perforation
121 disc block section
122 fitting section
123 circular hole section
124 first engagement section 125 locating hole
141 middle ring section
142 upper ring section
143 lower ring section
144 second engagement section
145 first worm gear section
151 shaft body section
152 eccentric shaft section
153 second perforation
161 third engagement section
171 second worm gear section
311 pivot hole

What is claimed is:

1. An electric valve actuator, comprising:
   a lower casing having a first partitioning board and a second partitioning board to form a first chamber and a second chamber;
   a first perforation axially extending from the lower casing;
   a power output member having a disc block section and a fitting section downwardly extending from a disc block bottom face of the disc block section;
   a downwardly extending circular hole section being formed on a disc block top face of the disc block section;
   a first engagement section being formed on a circumferential wall of the circular hole section, the first engagement section being a first spur gear with a plurality of first engagement section teeth;
   an axially downwardly extending locating hole being formed at a center of a circular hole top face of the circular hole section, the fitting section being downwardly pivotally located in the first perforation with the disc block section positioned in the second chamber;
   a rod member;
   a bottom end of the rod member being fixedly disposed in the locating hole;
   a first transmission member having a middle ring section, an upper ring section extending from a middle ring upper side of the middle ring section, and a lower ring section extending from a middle ring lower side of the middle ring section, the lower ring section being pivotally disposed around a disc block upper section of the disc block section;
   a second engagement section being disposed on a middle ring inner circumference of the middle ring section, the second engagement section being a second spur gear with a plurality of second engagement section teeth, the number of second engagement section teeth being slightly different from the number of first engagement section teeth; and
   a first worm gear section being disposed on a middle ring outer circumference of the middle ring section.

2. The electric valve actuator as claimed in claim 1, wherein the lower casing is substantially in the form of a cuboidal body, the lower casing having a bottom board section and a frame section upward extending from a periphery of the bottom board section to define a receiving space open to a top side, the first partitioning board and the second partitioning board being disposed in the receiving space.

3. The electric valve actuator as claimed in claim 1, further comprising a hub section downwardly extending from a board bottom face of a bottom board section, the hub section being formed with a first perforation axially extending from a hub bottom face of the hub section to a board top face of the bottom board section.

4. The electric valve actuator as claimed in claim 1, further comprising a second transmission member having a shaft body section;
   an eccentric shaft section axially downwardly extending from a shaft body bottom section of the shaft body section; and
   an axially downwardly extending second perforation being formed on a shaft body top section of the shaft body section, the second transmission member being pivotally disposed on the rod member via the second perforation.

5. The electric valve actuator as claimed in claim 1, further comprising a third transmission member pivotally disposed on an eccentric shaft section of a second transmission member;
   a third engagement section being disposed on a third transmission outer circumference of the third transmission member, the third engagement section being a third spur gear;
   a third engagement lower section of the third engagement section being engaged with the first engagement section; and
   a third engagement upper section of the third engagement section being engaged with the second engagement section.

6. The electric valve actuator as claimed in claim 1, further comprising a first worm pivotally located in the second chamber and engaged with the first worm gear section; and
   a hand wheel mountable at one end of the first worm.

7. The electric valve actuator as claimed in claim 1, further comprising a fourth transmission member fixedly disposed on a shaft body section; and
   a second worm gear section being disposed on a fourth transmission outer circumference of the fourth transmission member.

8. The electric valve actuator as claimed in claim 7, further comprising a second worm, two ends of the second worm being respectively pivotally located on the first partitioning board and on the second partitioning board, the second worm being engaged with the second worm gear section.

9. The electric valve actuator as claimed in claim 8, further comprising a drive motor disposed in the first chamber capable of driving the second worm to rotate.

10. The electric valve actuator as claimed in claim 1, further comprising a cover board mounted on upper sides of the first chamber and the second chamber, the cover board capable of blocking the first chamber and the second chamber, the cover board being formed with a pivot hole in a predetermined position.

11. The electric valve actuator as claimed in claim 10, further comprising a rod top section of the rod member, the rod top section being pivotally disposed in the pivot hole.

12. The electric valve actuator as claimed in claim 1, further comprising an upper casing mounted on a lower casing upper side of the lower casing.

13. The electric valve actuator as claimed in claim 3, further comprising a second transmission member having a shaft body section;
   an eccentric shaft section axially downwardly extending from a shaft body bottom section of the shaft body section; and
   an axially downwardly extending second perforation being formed on a shaft body top section of the shaft body section, the second transmission member being pivotally disposed on the rod member via the second perforation.

14. The electric valve actuator as claimed in claim 13, further comprising a third transmission member pivotally disposed on the eccentric shaft section;
   a third engagement section being disposed on a third transmission outer circumference of the third transmission member, the third engagement section being a third spur gear;
   a third engagement lower section of the third engagement section being engaged with the first engagement section; and
   a third engagement upper section of the third engagement section being engaged with the second engagement section.

15. The electric valve actuator as claimed in claim 14, further comprising a fourth transmission member fixedly disposed on the shaft body section; and
   a second worm gear section being disposed on a fourth transmission outer circumference of the fourth transmission member.

16. The electric valve actuator as claimed in claim 15, further comprising a first worm pivotally located in the second chamber and engaged with the first worm gear section; and
   a hand wheel mountable at one end of the first worm.

17. The electric valve actuator as claimed in claim 16, further comprising a second worm, two ends of the second worm being respectively pivotally located on the first partitioning board and on the second partitioning board, the second worm being engaged with the second worm gear section.

18. The electric valve actuator as claimed in claim 17, further comprising a drive motor disposed in the first chamber capable of driving the second worm to rotate.

19. The electric valve actuator as claimed in claim 18, further comprising a cover board mounted on upper sides of the first chamber and the second chamber, the cover board capable of blocking the first chamber and the second chamber, the cover board being formed with a pivot hole in a predetermined position.

* * * * *